July 12, 1955  H. N. JENKS  2,713,028
SEWAGE TREATMENT
Filed April 20, 1951  4 Sheets-Sheet 3

INVENTOR:
HARRY N. JENKS,
BY
Arthur Middleton
ATTORNEY

July 12, 1955          H. N. JENKS          2,713,028

SEWAGE TREATMENT

Filed April 20, 1951          4 Sheets-Sheet 4

INVENTOR:
HARRY N. JENKS,
BY
ATTORNEY

2,713,028

SEWAGE TREATMENT

Harry Neville Jenks, Palo Alto, Calif.

Application April 20, 1951, Serial No. 221,964

7 Claims. (Cl. 210—7)

This invention relates to the purification and clarification of sewage, trade and other polluted waste liquids, and more particularly relates to such treatment by the use of what is known generally as the activated sludge system.

In such a system, the sewage or other waste liquid is usually first subjected to primary settling to remove the settleable solids, whereupon the effluent from the settler is passed to tanks, called aerators, where the liquid is subjected to diffused air which encourages the formation of the activated sludge. Liquid from the aerators goes into a secondary or final settler where activated sludge resulting from such aeration is removed from the liquid and returned to the aerators. The effluent liquid from the secondary clarifier has thus been clarified and purified. Sludge from both the primary and secondary settlers is then usually digested or otherwise disposed of.

The invention hereof comprises an improvement on or constitutes an improvement over such a system, which is rather expensive because of the complex structures; because of the expense of the requisite equipment and because of operating expense. So it is an object of this invention to devise a substitute system that significantly overcomes those disadvantages, and yet retains at least most of the advantages of such a system.

Sewage treatment usually follows one or the other of two general types. One of these is the activated sludge process while the other is the trickling filter process. These are distinguished by the marked difference in the yielded sludges themselves but operationally by the fact that in the trickling filter process the biologic organisms that are used to treat the sewage are stationary on the discrete stones or cinders that make up the filter bed medium. The bacteria and other biologic organisms of the filter bed form zoogleal films on those stones, and these films are of substantial extent. Sewage to be so treated is recycled from a settler and admixed with newly incoming sewage so that while the biologic organisms remain fixed, the sewage is brought to them.

On the contrary, in a plant operated in accordance with the activated sludge process, the biologic organisms are maintained in motion through the sewage. Such organisms are established and maintained in an aerating tank whose liquid is well aerated to produce an aerobic environment conducive to activity of such organisms. Sludge from the two processes are noticeably different, activated sludge being more bulky than filter bed sludge, but the former being somewhat more easily digested than the latter. Another difference is observable in the plant effluent. In the trickling filter process, or trickling filter bed process as the same is sometimes referred to, effluent which has been stablized as to its biological oxygen demand (B. O. D.) is not as sparkling clear as is the effluent from an activated sludge plant. Yet as a filter bed plant is significantly cheaper both as to installed and operating costs as compared with an activated sludge plant, all of these factors must be correlated in determining which plant should be installed in a particular locality. So it is another object of this invention to get the benefits of both of these types of plants in what is believed to be an entirely new type of plant or system.

Going back for a moment to these two known types of plants, in the trickling filter bed plant the biologic organisms, which hereinafter for short will be referred to merely as bacteria, are both incubated and run their life cycle within the filter bed where they are in effect fixed to the stones of the bed or to their zoogleal jelly thereon. As they are thus immobilized, it is necessary to bring food to them in the form of sewage to be treated, and to remove from them their excrescences. Contrariwise, in an activated sludge plant, the bacteria are both incubated and run their life cycle while being mobilized or moved about and circulated through the sewage on which they feed and convert innocuously into their excrescens. I have observed that it is easier to incubate the bacteria while fixed to the bed but that it is more effective to circulate them through sewage for the best sewage-treatment results. So it is another object of this invention to accomplish that as a desired end—namely, to incubate the bacteria while fixed on stones of a bed and immediately after incubation remove them by transfer to a detaining-mixing station through which the sewage is circulating.

But in a usual trickling filter bed, which is normally six feet deep or so, the bacteria reproduce and grow in zoogleal films on the stones of the bed. These films and the stones themselves reduce the interstices, so that the rate of dosing of sewage on such a filter bed is relatively limited. So it is a further object of this invention to prevent the accumulation of any substantial quantity of such films by flushing them off as fast as formed, and to be able to reduce the depth of the bed to be of the order of only one foot in depth made up of larger-than-ordinary stones to maximize the size and extent of the interstices between the stones. Indeed, my use of such a discrete bed is not as the usual trickling filter bed but perhaps in a shallow quick transit or fast through-flow bed which should better be called a colloider and which I have discovered by try-out and use can be employed to function as a biologic incubator and an effective aerator while avoiding growth of zoogleal gels on the stones or other bodies of discrete material making up the thin or shallow bed.

In a usual activated sludge plant, the aerator is a tank or place in which diffused air is continually bubbled up through the sewage circulating in the tank. This is expensive, so it is another object to render the use of diffused air unnecessary, by devising holding or detention tanks so arranged that the sewage in them is rapidly recirculated to the abnormally shallow filter bed or colloider of this invention whereby the sewage is amply aerated in such a manner.

So one feature of this invention relates to the rates of application of sewage or other polluted liquid onto the filter-bed to be higher than anything heretofore considered feasible, as will hereafter appear, while at the same time using for such filter a discrete bed of less depth than heretofore attempted. Another feature comprises using detaining or holding-mixing tanks (with no sedimentation therein) concomitantly with the smaller and shallower discrete bed, which is commercially advantageous becaues a unit of volume of such tanks is far less expensive to build than a unit of volume of aeration tanks as employed in the conventional activated sludge process and the bed can be made more effective thereby. It is a feature of this invention that such tanks have no equipment in them such as sludge rakes, so they are inexpensive to build and to operate. A further feature of this invention resides in the design, operation and control of the units of the combination of machines or apparatus used whereby it is possible to realize a maximum number of contacts with the minimized zoogleal films on the discrete rocks or cinders of the bed by each drop of polluted liquid during each unit of time. A further important feature of this invention is the putting into practice of the discoverey that a colloiding operation and an effective entrained aeration, as by flowing organically polluted liquid through a single layer of stones or other such discrete material, is sufficient provided the bed discharge is directly, or in short order, passed to a detaining station fulfilling the dual function of providing the required time of not less than three hours for so-called complete treatment by biologic oxidation (but a lesser time for intermediate treatment), and for keeping the activated sludge in intimate admixture with and in suspension in the liquid.

A further feature of this invention is that the place or station for holding and mixing from which the liquid and sludge are passed to the colloider bed and returned, comprises two sequential continuously vortically rotating or swirling bodies of such mixture of equal size, into the peripheral portion of which any incoming liquid is submergedly delivered. As to said swirling bodies, one may rotate at speed greater than another. I have ascertained that the passing of the mixture to the colloider bed and return is such that the mixture makes at least 10 passes to the colloider in the detention time of the mixing station, or stated in another way the rate of recirculation during the period of detention equals at least 10 times the volume of the detaining and mixing station.

These features are embodied in a plant receiving polluted liquid and having in closed circuit or cyclic arrangement a detaining and mixing station and an aerator-colloider.

Furthermore, in addition to the novel structural features and operative steps just referred to, it is also pointed out herein how the detaining and mixing station is brought into cyclic operative arrangement with a secondary or subsequent settler that receives secondary oxidized liquid passed thereto from a low interior section of the secondary holding-mixing tank of the detaining and mixing station, thence through a gravity flow line leading into a secondary or subsequent settler—having a high overflow weir for progressively releasing stabilized purified effluent—and which subsequent settler has a return sludge line leading from a low interior portion thereof and equipped with pumping means for delivering the sludge purified thereby into the upper interior portion of a primary holding-mixing tank, with result that the detaining and mixing station and the subsequent settler are brought into cyclic operative arrangement with each other.

Unlike activated sludge plants heretofore, this invention teaches the divorcing of aeration or sludge-activation—to wit: as heretofore accomplished by the direct injection of air into holding tanks—and instead relies upon a rearranging of the action steps so that the aeration or activation is effected in a high-rate or rapid-transit trickling filter bed, while the agitated holding or detaining function and the mixing function are combined in primary and secondary holding-mixing (and non-aerating) tanks of the detaining and mixing station, into which the resulting aerated or activated effluent from the rapid-transit bed of discrete material is gravitatingly delivered. By divorcing the zone of forced aeration from within holding tanks there is avoided a submerged delivery of pumped air against the hydrostatic head of the overlying liquid within that which has now become the primary and secondary holding-mixing tanks. The required aeration is made possible by the phenomenally rapid-transit flow through or high recirculation rates from the filer bed.

In this new concept where the primary and secondary holding-mixing tanks constituting a detaining and mixing station are employed, there is no sedimentation therein, and they are in operative combination and cyclic arrangement with the super-rate aerating colloider provided by the shallow rapid-transit bed of discrete material; there is only mixing within the tanks, and little—if any—recirculation between tanks. This follows since all the liquid uprising in the riser, or as otherwise expressed passed from the pump, goes directly to and for distributed delivery across the aerator-colloider bed of discrete material, the function of which is for receiving the recirculating liquid and for aerating the liquid while in transit therethrough and for colloiding the colloidable fractions of the transiting liquid.

As a matter of fact the dosing rate for this aerating colloider may be as high as 800 million gallons a day (M. G. A. D.) while the low limit is not substantially less than 200 M. G. A. D. This is a dosage rate of all proportion to the dosage rates employed in operations using the heretofore employed trickling filter beds.

Such a plant as that illustrated herein and described hereby is based upon the fact that the detaining and mixing station is the real workshop of the purifying and clarifying bacteria or other biologic organisms, while the only real function of the colloider bed is that of an incubator and of a supplier of dissolved oxygen for the bacteria. It is this concept that makes possible cutting down the volumetric capacity of the bed figuratively to vest-pocket size. The enormous and unprecedented super-rates of application of feed to the tiny colloider bed play their part too in the incubation of myriads of active bacteria and the immediate flushing of them and their jelly into their workshop in the detaining and mixing tank while there is still left to them a significant proportion of their life cycle of the order of twenty minutes or even less. It is for this reason that the super-rates of application of liquid to the colloider bed are important. The rate of dosage is far above anything accepted heretofore and the upper limit is substantially 800 M. G. A. D.. The lower limit is not less than 300 M. G. A. D. and in fact the higher the dosage is above that the better are the results. This dosage should appear to the present-day plant operator as out of all proportion to the small size and very shallow depth of the colloider bed. The yard-stick stated in words is enough liquid fed to realize maximum contacts by a drop of liquid with zoogleal films in one unit of time and as rapid a passage of liquid through the bed as can possibly be obtained. Such rapid passage I consider to be at the rate of 1.4 feet per minute or faster. Another way of saying this is that a drop of sewage liquid should take, in the practice of this invention, from 10 to 40 seconds to pass through the bed, with less than 30 seconds as optimum.

The detaining and mixing station is the chief zone of biologic oxidation resulting from the activated sludge developed by repeated passage through the colloider and returned to the system after being settled in the secondary clarifier or settler. The multitudinous number of very active bacteria are avidly hungry for food since they must eat continuously and not like vertebrates only intermittently. Being so avid for food, when they are recycled to the detaining and mixing tank they supplement the bacteria received therein from the colloider bed, with the result that the particles of turbidity suspended in the liquid of the usual secondary or final settler are consumed by the bacteria and thus converted by the life processes of the bacteria from solid to liquid phase, since the end product of the bacteria is liquid.

As to the super-rates of application to the colloider bed, it was considered heretofore impossible to dose a discrete bed at any such rates. The reason was because the bed would pond, namely, become submerged. The liquid would fill the interstices between the rock or stones that make up the bed and the water would back up, causing ponding. In other words, the water would cease to trickle or percolate through the stones. That is true, but I found that when more than enough liquid was supplied to the bed ponding ceased and percolation began again apparently not to recur at high rates of application or dosing. With this in mind, I tried cascading the liquid at such super-rates over a single layer of stones, say only three inches thick, set in an inclined plane, whereupon I found that such an arrangement gave excellent results when combined with the abnormally long detention time in the detaining and mixing tank. When this combination was supplemented with the final clarifier or settler, I found that not only was the biochemical oxygen demand of the polluted liquid satisfied, but that a clarity of effluent (absence of turbidity) was obtained that had never before been realized in a single stage sewage treatment plant. Also by the use of this invention I can get a plant in commercial operation in three days instead of three weeks. Yet to apply sludge directly to a discrete bed has heretofore been considered impractical.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims, or of equivalents of such metes and bounds, are therefore intended to be embraced by those claims. The best embodiment of the invention now known to me is illustrated in the accompanying drawings wherein:

Fig. 1 diagrammatically illustrates by a vertical elevational view the primary settler for incoming influent and the flow arrangements and connections of the detaining and mixing station, the aerator-colloider and the secondary settler already referred to.

Figure 5:
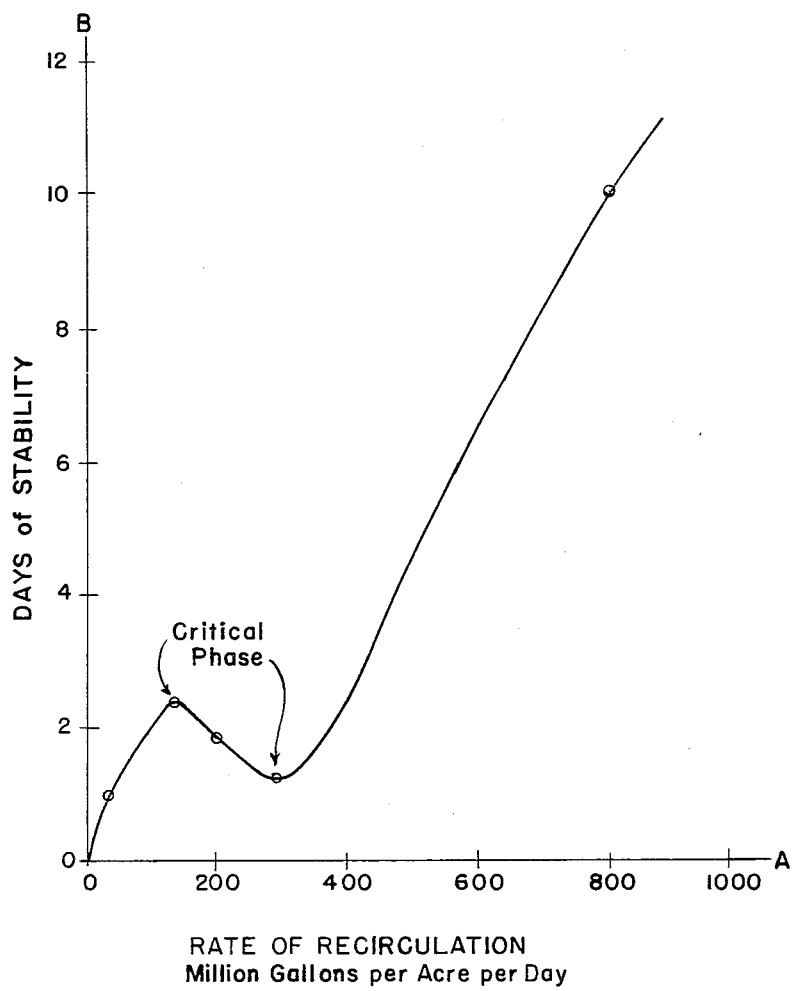

Fig. 5 is a graph diagrammatically showing the relationship of the stability of biological oxygen demand reduction and recirculation rates through the super-rate colloider or aerator-colloider referred to herein. The rate of recirculation in million gallons per acre per day is indicated by and determinable from the notations made on the horizontal ordinate line O—A and the expected days of stability attainable thereby, based on experimental data and observations, are indicated by the marked gradations arranged along and with respect to the abscissa O—B.

Figure 1:
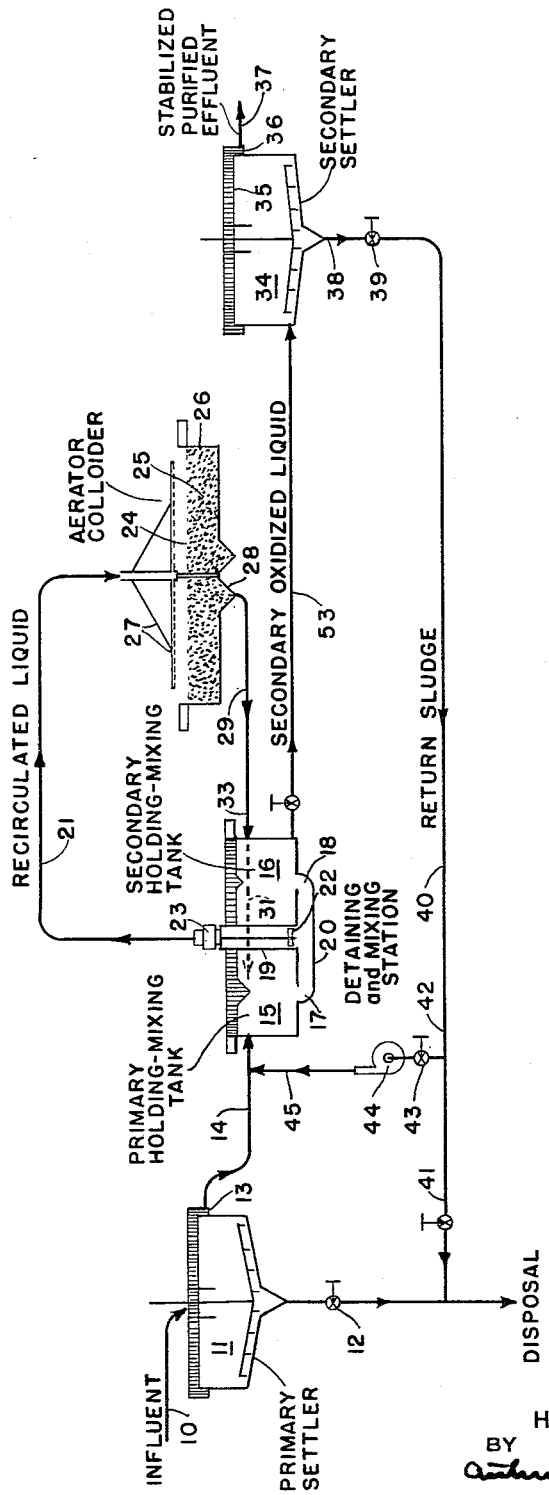
Figure 2:
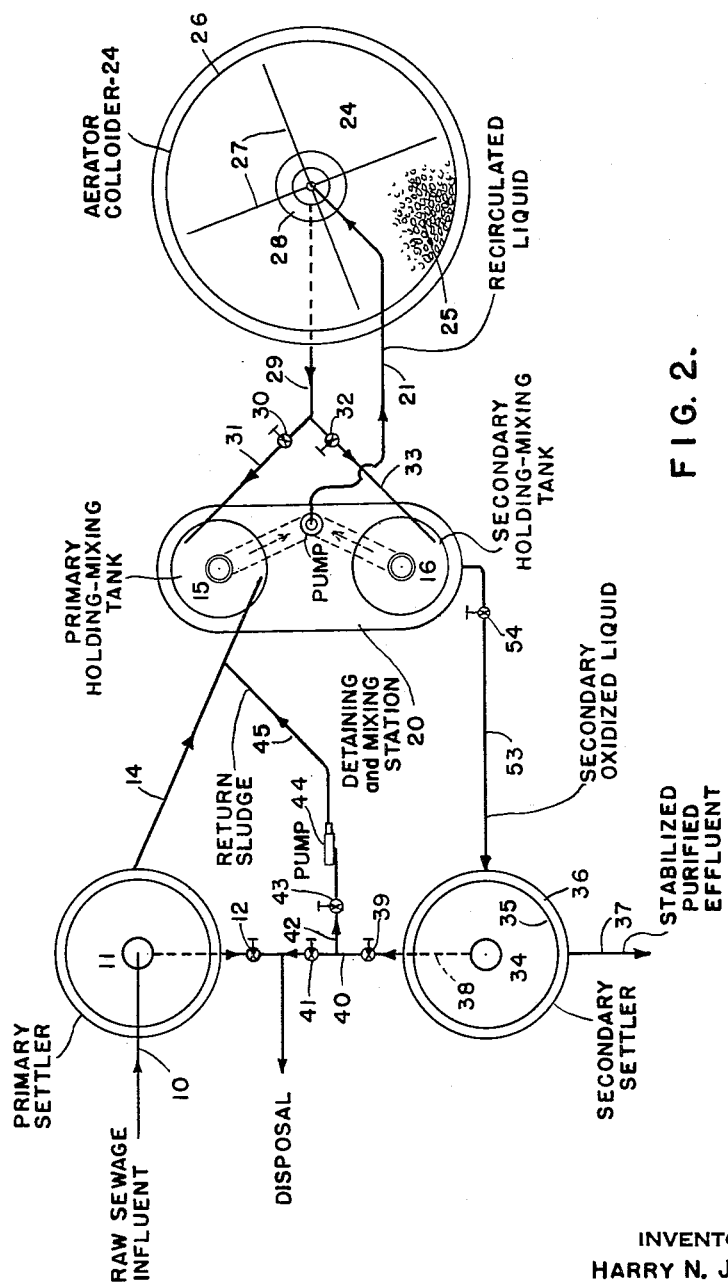
Fig. 2 is a diagrammatic view illustrating by plan the several instrumentalities and pieces of apparatus referred to in connection with the description of Fig. 1.

*Flowsheets of Figs. 1 and 2*

In these figures the reference character 10 represents an influent flow line by which influent sewage is delivered into the primary settler 11, typified as aforementioned by a clarifier of the Dorr raking type. In this clarifier or settler 11 settled solids are collected as sediment and passed at will from the bottom of the settler through the valve-controlled discharge pipe 12 for disposal outside of the plant. From the settler clarified effluent is passed from the effluent launder 13 and is delivered therefrom by means of the clarified effluent line 14. This clarified effluent line 14 actually functions as a gravity flow feed line leading into a primary holding-mixing tank 15 embodied as part of a detaining and mixing station 20, which station 20 also includes as a part thereof a secondary holding-mixing tank 16. The invention of this patent may be viewed as starting with the delivery of raw sewage clarified effluent or other type of organically polluted liquid by means of the line 14 serving as a means for directing the raw sewage clarified effluent or other organically polluted liquid, as the case may be, into the primary holding-mixing tank 15 or, as otherwise expressed, as feed into the detaining and mixing station 20. Such being the case, it may be well here to describe specifically the construction of the detaining and mixing station 20 and the primary and secondary holding tanks 15 and 16 thereof, thereafter to describe the aerator-colloider 24 in a general manner, and subsequently to describe the pumping and piping arrangement by which the station 20 and the holding-mixing tanks 15 and 16 thereof on the one hand and the aerator-colloider 24 on the other hand are cyclially connected, whereby there is repetitive cyclic recirculation of the liquid quantities supplied to and successively passing from the cyclic system or assemblage of the parts thus functionally embodied and providing this cyclic set of members or parts just referred to.

Figure 3:
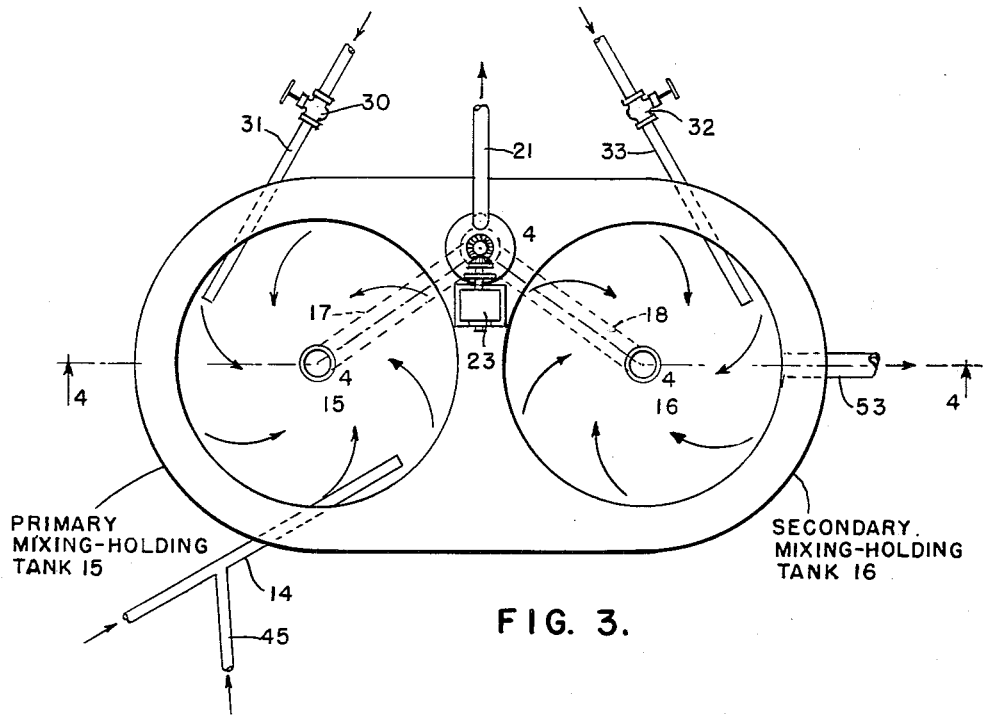
Figs. 3 and 4 are respectively plan and vertical sectional views of the detaining and mixing station and the primary and secondary holding-mixing tanks thereof; as to Fig. 4 this is a vertical sectional view of the parts shown in Fig. 3, to wit: as taken on vertical planes indicated by the broken dot-and-dash line 4—4—4—4—4 of Fig. 3.
Figure 4:
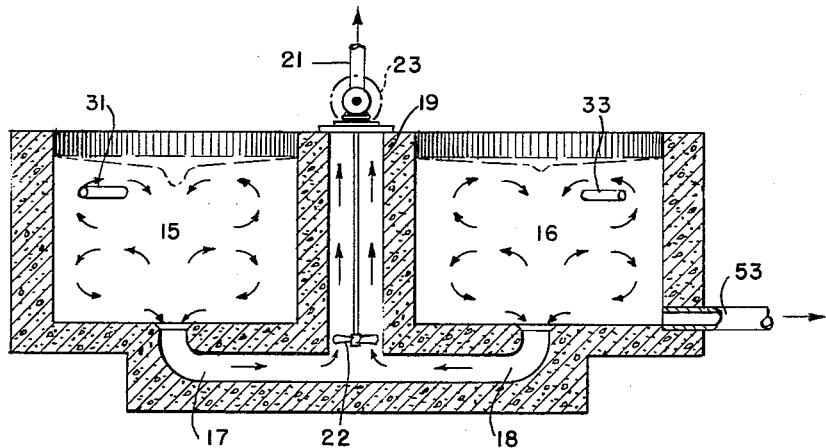

*Detaining and mixing station 20 (Figs. 3 and 4)*

The detaining and mixing station 20 is that part of the treatment plant wherein clarified but organically polluted effluent derived as a result of sedimenting raw incoming sewage is delivered into the treating section or treating plant proper. The clarified but polluted effluent thus obtained, or any other organically polluted liquid supplied for treatment, is initially fed for treatment and is delivered to and received in the primary holding-mixing tank 15 of the detaining and mixing station 20. This station has as an important function detaining and mixing so it may be comprised of a single tank or a plurality thereof. From Fig. 4 it can be seen that in the station 20 there is a vortical swirling that is characteristic of each tank used and also that in each there are two distinct circulatory areas, of which one is above the other, as shown by the two series of arrows. The liquid swirls about a vertical axis and meanwhile there are some up and down movements confined more or less in the upper section of the liquid body with further up and down movements confined more or less in the lower section of the liquid body. This makes for highly effective mixing. The location of this vortical station with respect to other operatively associated structural or functional features of the plant is readily discernible by reference to Figs. 1 and 2.

As to the preferred form of station 20, it is provided with primary and secondary tanks 15 and 16 respectively, each having a liquid receiving and holding section circular in plan and of substantial depth. The clarified effluent from the primary settler, or other organically polluted liquid supplied for treatment, is passed by gravity flow into the upper region of the liquid holding portion of the primary tank 15, wherein the polluted liquid fed for treatment is submergedly delivered tangentially in a horizontal direction into the liquid body within the primary tank 15.

This detaining and mixing station 20 also includes and has associated with the primary and secondary holding-mixing tanks 15 and 16 thereof pumping means that includes a riser conduit section 19 that serves as or provides a pump casing structure and a continuously submerged propeller 22 or other suitable flow-impelling means actuated by a motor 23. This pump is operatively associated with the primary and secondary holding-mixing tanks 15 and 16 through the medium of respective suction conduits or pipe-providing sections 17 and 18 leading from the lower interior portions of the primary and secondary tanks to the suction side or suction intake of the pump casing provided by the riser section 19. By said pump liquid sucked from the primary and secondary tanks can be and is forcibly delivered from the discharge section of the pump or pump casing 19 to a locality whereat the thus pumped and delivered liquid is transferred as recirculated liquid—for example, through and along a recirculated liquid pipe 21 leading to the aerator-colloider 24, having means 27 for receiving the recirculated liquid and for distributively delivering the same over and across the shallow bed of discrete material 25 constituting an important functioning feature of the aerator-colloider 24. The recirculated liquid distributively delivered to and upon the bed 25 flows through the bed and is delivered as bed discharge which is ultimately received within the sump 28 of a tank 26 that is provided for receiving and holding the bed. From this sump 28 just referred to the bed discharge passes along pipe 29 having valve-controlled branching pipe sections 31 and 33 which respectively submergedly deliver in horizontal tangential directions that quantity of bed discharge passing therethrough and therefrom; a quantity of the bed discharge passes into the upper interior portion of the primary holding-mixing tank 15 and a quantity into the upper interior portion of the secondary holding-mixing tank 16. The branching pipe 31 has a control valve 30 therein and branch pipe 33 has a control valve 32 therein.

From that which has preceded with relation to the description of the pump which includes the riser conduit section 19, or pump casing section 19 as it may be and is properly referred to, it will be noted that the recirculated liquid line 21 extends from and is in flow pressure communication with the otherwise closed upper end portion of the riser or from that which may be referred to as a discharge casing section of the pump. From this discharge casing section of the pump the recirculated liquid line 21 leads to and discharges into the distributing feed means 27 overlying the aerator-colloider bed 25. Said feed means 27 constitutes a feed distributing means functionally and operatively associated with said bed.

With respect to the several flow lines by which liquid is submergedly tangentially delivered in a horizontal direction into the upper interior portions of the liquid receiving and holding sections of the primary and secondary tanks 15 and 16, it will be observed that of these the tangentially disposed liquid feed line 14 and the tangentially disposed branch 31 of the gravity flow bed discharge line 29 provide gravity delivery into the primary holding-mixing tank 15. The valve-controlled branch delivery section or line 33 and the pipe section 45 thereof, which merges into the terminal portion of gravity flow feed line 14, provides for the tangential delivery of pumped return sludge from the secondary settler into the primary holding section 15. The tangential deliveries into the primary holding section 15 are all in directions favorable to imparting swirling action to liquid movement therein, as indicated by arrows in Fig. 3. The valve-controlled branch pipe 33 has a tangential submerged delivery into the upper portion of the secondary holding-mixing tank 16, whereby there is imparted a swirling motion to the liquid in that secondary tank in the direction indicated by the arrows in Fig. 3. A swirling motion in each of the primary and secondary tank sections 15 and 16 just referred to is important, or at least helpful, but the direction of the swirl in each one of these primary and secondary tanks 15 and 16 is immaterial. The essential thing is that a swirling motion shall be imparted to each of the bodies of liquid within tanks 15 and 16.

The primary and secondary tanks or tank sections 15 and 16 for holding the swirling or rotating liquid bodies are from 4 to 100 feet in diameter and from 6 to 12 feet deep, with a detention capacity of the order of three hours upwards for so-called complete treatment but of not less than one and one-half hours for intermediate treatment. The dimensions are relatively unimportant in themselves, except as they relate to the holding time to be provided for in the plant. Each tank is such that the feed thereto preferably causes a spiralized vortical flow therein having a peripheral speed of the order of from .5 to 1.5 feet per second. The peripheral speed of the liquid spiralizing in each tank is such that flocs formed therein do not tend to be disintegrated. The spiralized action of the liquid in each tank leads to furthering flocculation since arcuate planes or cylindrical sections of liquid tend to slip past other such sections at effective flocculating speeds. This relative motion between adjacent arcuate films of liquid contributes to the coagmentation of particles of turbidity into flocs and such continued action tends to roil up the flocs to compact them into settleability.

From a lower portion of the secondary tank 16 there extends a valve-controlled secondary oxidized liquid transfer line 53 leading from a lower interior portion of the secondary holding-mixing tank 16 to the secondary settler 34 hereinafter referred to. This secondary oxidized liquid transfer line 53 has a positionable control valve 54 therein.

Aerator-colloider 24

This aerator-colloider 24 embodies a thin layer or bed of discrete material 25 in an open top casing or container structure 26 having a low liquid collecting portion or sump 28 for receiving bed effluent. The aerator-colloider also has a liquid distributing means 27 for receiving recirculated liquid fed thereto by recirculated liquid pipe 21 for distribution of the recirculated liquid thereby to or in operative relationship with respect to the discrete bed 25 and constructed for effecting a relatively uniform distributed delivery of recirculated liquid passed thereinto and therefrom prior to treatment or repetitive treatment of the successive quantities of liquid as delivered to and upon the bed of discrete material 25. Since the bed of discrete material is relatively thin and the openings or passageways between the several bodies of discrete material are relatively large, there is a quick passage or transit of the liquid delivered from the distributing means downwardly within, through and from the bed of discrete material.

It is here to be noted that the depth of this material which I have found as being satisfactory and effective for the purpose intended and which has been used by me is one foot and my recommendation would be that this bed should have a depth of not over two feet.

This aerator-colloider is intended to effect a major aerating action on the liquid supplied thereto each time it makes a transit through the bed. It also serves to effect a colloiding of particles in the liquid passing through the bed. The colloided liquid or bed discharge is passed from the colloider—to wit: from the sump 28 thereof—through the transfer line 29 having valve-controlled branch delivery sections 31 and 33 whereby a quantity of the colloided liquid or bed discharge is delivered into the primary tank 15 by the branch section 31 and a quantity is delivered into the secondary tank 16 by the branch section 33.

Secondray oxidized liquid line 53 and subsequent settler 34

There is a progressive feed of liquid into these tanks and a corresponding discharge of liquid from the secondary holding-mixing tank 16—to wit: through a secondary oxidized liquid transfer line 53, if desired, having valve 54, into the liquid receiving and holding section of a secondary or subsequent settler 34, from which settler clarified liquid can pass as overflow over weir edge 35 into an effluent launder 36 and thence as stabilized clarified liquid by means of the effluent pipe 37 leading to a region outside of the apparatus. This discharge of stabilized purified effluent from the line 37 substantially corresponds in quantity to that of the inflowing liquid supplied to the primary holding-mixing tank 15 by the line 14 which serves as a feed line leading into the primary holding-mixing tank 15. This secondary oxidized liquid line 53 is equipped with means for releasing from the apparatus a quantity of liquid substantially equal to that of the quantity of feed liquid directed into the primary holding-mixing tank for treatment. Such liquid release may be provided by an outlet control means such as an overflow weir 35, whence the flow passes through the effluent line 37. Valve 54 is not actually necessary to the operation of the system, since the flow from the holding-mixing tank to the secondary settler is by gravity and the liquid-level in the holding-mixing tanks is automatically controlled by the elevation of the overflow weir 35 in settler 34. The valve can be used in shutting down the system for repairs.

*Subsequent settler 34 and return sludge line 39*

Effluent from the settler 34 by means of weir 35 determines the liquid-level in the holding-mixing station 20. Underflow from that settler 34 is passed by the return sludge line 38—past the valve 39 thereof—and into the section 40 of the return sludge line to a branching pump line 42 controlled by valve 43 leading to pump 44 having a pump outflow section 45 leading into the gravity flow feed line 14 leading into the primary holding-mixing tank 15. This is a condition existing when the valve 41 is closed. If the valve 43 of line 42 is closed and the valve 41 of the return sludge section 40 is open, then there can be a transfer of sediment or outflow from the second settler to a locality outside of the apparatus for disposal thereof. In connection with the foregoing it will be observed that the detaining and mixing station 20 is connected in cycle path arrangement by the gravity flow secondary oxidized liquid line 53 leading from a low interior portion of the secondary holding-mixing tank 16 to and into the secondary or subsequent settler 34, thence along return sludge line 38 and section 40 into pipe section 42 leading into pump 44 and from the latter by the pipe or line 45 to the feed delivery section of gravity flow line 14 and thus tangentially into the upper interior circular section of the primary holding-mixing tank 15.

A contemplated example of an embodiment of this invention is as follows:

```
Primary and final clarifiers_____  30' dia. x 8' deep
Holding-mixing tanks_____   30' dia. x 12' deep
Aerator-colloider _____   30' dia. x 1' deep
                                  (700 sq. ft.; 30% voids)
Recirculation pumps—each_____   2800 g. p. m.
Type of waste_____   Domestic sewage
Detention period:
    Clarifiers—each _____   2.87 hours
    Mixing tanks—total_____   8.60 hours
    Recirculation ratio_____  11.5
    Transit time through col-
        loider _____   30 seconds
    Recirculation (2800 g. p. m.)_ 6.2 cfs.
    Estimated B. O. D. reduction_ 90%
```

From that which has preceded it is believed the manner of performing or realizing the advantageous features of construction and of the operative steps of the new process constitute the basis of certain phases of the invention which will be readily understood and appreciated.

The bed of the aerator-colloider functions as a biologic bed and in connection therewith it will be noted that this bed has to be initially inoculated with aerobic biologic organisms of a character capable of establishing and maintaining certain biological functions and development in the liquid flowing through the bed, which is not only aerated while flowing therethrough but is also further biologically treated while in transit through, from, within and leading into the detaining and mixing station 20. Such a station can be used to advantage especially when embodying the teachings of my co-pending application Ser. No. 705,127, now abandoned, filed December 9, 1946 of which parent application this application is a continuation-in-part.

I claim:

1. In a process of treating sewage, the steps comprising establishing a colloider bed of discrete solids having a bed depth of from one to two feet, inoculating the bed with aerobic biologic organisms capable of purifying the sewage, supplying clarified sewage to a detention and mixing zone, detaining it there for at least one and a half hours, meanwhile mixing therein such sewage with activated sludge, passing through the bed such mixture drawn from the zone, and returning liquid that has passed through the bed to the zone with the rate of passage being at a velocity such as to flush from the bed zoogleal films substantially as fast as formed as well as to impel any one drop of liquid to transit through the bed in from 40 to 10 seconds.

2. The steps according to claim 1, wherein liquid from the mixing and detention zone is passed to the colloider bed at a rate equal at least to substantially 10 times that detained volume.

3. The steps according to claim 1, with the addition of flowing treated liquid from the mixing zone to a body of such liquid held in quiescent sedimentation, and controlling the liquid-level in the mixing zone by the liquid-level in the quiescent body.

4. The steps according to claim 1, wherein the detention and mixing is carried out in sequence by vortically rotating the liquid and sludge in a primary and a secondary cylindrical liquid body of substantially equal size but at different vortical speeds, and conducting aerated effluent from the secondary body back ahead of those bodies in the treatment system.

5. The steps according to claim 4, with the discharge from the colloider bed passing some to one and some to the other of the two vortically rotating bodies.

6. The continuous biologic process of treating polluted liquids, which comprises supplying feed for treatment in a system including a shallow biologic filter bed of discrete material and a detention zone, controllably passing effluent from the detention zone through the filter bed at a rate maintained to lie in a range of from 200 to 800 million gallons per acre per day and the time of passage of the liquid through the bed to lie in a range of from 10 to 40 seconds, returning discharge from the bed to the detention zone having a detention capacity of from 3 to 24 hours inflow of feed supplied to the system, and releasing biologically stabilized liquid from the system.

7. Those steps in sewage treatment that comprise establishing and maintaining a bed of discrete solids having a bed-depth not substantially in excess of two feet, establishing and maintaining inoculation of the bed with aerobic biologic organisms capable of purifying sewage, applying sewage liquid to the bed, and passing it therethrough in volume to lie in a range of from substantially 200 to substantially 800 million gallons per acre per day to impel any one drop of liquid to transit through the bed in from 40 to 10 seconds with the faster being the better.

References Cited in the file of this patent

UNITED STATES PATENTS

| Number | Name | Date |
|---|---|---|
| 2,021,679 | Bevan | Nov. 19, 1935 |
| 2,077,498 | Streander | Apr. 20, 1937 |
| 2,120,634 | Stevenson | June 14, 1938 |
| 2,142,196 | Langdon | Jan. 3, 1939 |
| 2,348,126 | Green | May 2, 1944 |
| 2,355,760 | Trebler | Aug. 15, 1944 |
| 2,528,887 | Kickhoefel et al. | Nov. 7, 1950 |
| 2,562,510 | Schlenz | July 31, 1951 |